(12) United States Patent
Kitain et al.

(10) Patent No.: US 10,565,799 B2
(45) Date of Patent: Feb. 18, 2020

(54) AUTOMATIC COCKPIT IDENTIFICATION AND AUGMENTED IMAGE PLACEMENT

(71) Applicant: Lockheed Martin Corporation, Bethesda, MD (US)

(72) Inventors: Joshua D. Kitain, Orlando, FL (US); Jonathan P. Barkdoll, Orlando, FL (US); David J. Macannuco, Burlington, MA (US); Adam R. Breed, Orlando, FL (US); Howell B. Hollis, Orlando, FL (US); Spencer J. Frazier, Burlington, MA (US)

(73) Assignee: Lockheed Martin Corporation, Besthesda, MD (US)

( * ) Notice: Subject to any disclaimer, the term of this patent is extended or adjusted under 35 U.S.C. 154(b) by 9 days.

(21) Appl. No.: 16/014,625

(22) Filed: Jun. 21, 2018

(65) Prior Publication Data

US 2019/0392639 A1 Dec. 26, 2019

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *G09B 9/302* (2013.01);
(Continued)

(58) Field of Classification Search
CPC .. G06K 9/00664–00704; G06F 3/0481; G06F 3/04817; G06F 9/4443;
(Continued)

(56) References Cited

U.S. PATENT DOCUMENTS 8,781,794 B2 7/2014 Harrison et al.
9,583,019 B1* 2/2017 Schwartz ................. G09B 9/16
(Continued)

OTHER PUBLICATIONS

International Search Report and Written Opinion for International Patent Application No. PCT/US2019/038162, dated Oct. 4, 2019, 10 pages.

*Primary Examiner* — Todd Buttram
(74) *Attorney, Agent, or Firm* — Withrow & Terranova, PLLC (57) ABSTRACT

A head-mounted display (HMD) device is disclosed. The HMD device includes a frame and a display system coupled to the frame. A stereo depth camera system coupled to the frame generates stereo depth camera information comprising frames of imagery and depth data that identifies a distance to a simulator cockpit of a simulator. A processor device is coupled to the stereo depth camera system and to the display system. The processor device identifies, based on the stereo depth camera information, a particular cockpit model that corresponds to the simulator cockpit and that identifies a layout of cockpit controls of the simulator cockpit. The processor device, based at least in part on the cockpit model and a physical location of the simulator cockpit, generates computer-generated imagery. The processor device sends the computer-generated imagery to the display system to overlay the computer-generated imagery on top of a portion of a real-world scene.

20 Claims, 10 Drawing Sheets (51) Int. Cl.
 *G09B 9/30* (2006.01)
 *H04N 13/239* (2018.01)
 *H04N 13/332* (2018.01)

(52) U.S. Cl.
 CPC ......... *H04N 13/239* (2018.05); *H04N 13/332* (2018.05); *G02B 2027/014* (2013.01); *G02B 2027/0138* (2013.01)

(58) Field of Classification Search
 CPC .. G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
 See application file for complete search history.

(56) References Cited

U.S. PATENT DOCUMENTS

| | | | |
|---|---|---|---|
| 9,786,193 B2* | 10/2017 | Falash | G09B 9/24 |
| 10,311,742 B2* | 6/2019 | Falash | G09B 7/00 |
| 2015/0346722 A1 | 12/2015 | Herz et al. | |
| 2016/0019808 A1 | 1/2016 | Chavez et al. | |
| 2016/0093230 A1 | 3/2016 | Boggs et al. | |
| 2017/0069136 A1 | 3/2017 | Sharma | |
| 2017/0155892 A1 | 6/2017 | Herrera et al. | |
| 2017/0273552 A1 | 9/2017 | Leung et al. | |
| 2018/0286269 A1* | 10/2018 | Lechner | G09B 9/165 |
| 2019/0033888 A1* | 1/2019 | Bosworth | G05D 1/0808 |

* cited by examiner

AUTOMATIC COCKPIT IDENTIFICATION AND AUGMENTED IMAGE PLACEMENT

TECHNICAL FIELD

The embodiments relate generally to simulators, and in particular to automatic cockpit identification and augmented image placement.

BACKGROUND

Simulators reduce the financial cost of training and increase safety. The more realistic a simulation is, the better the training provided by the simulator will be. Further, a more realistic simulation makes it more likely that a trainee will learn and, when operating the actual vehicle being simulated, react appropriately.

A simulated cockpit used in a simulation may require substantial electronics to provide the visible and tactile feedback necessary to accurately simulate an actual cockpit. The electronics can be expensive, may require specialized cooling requirements, and need to be maintained and repaired over time.

Additionally, simulators often require one or more projectors that project simulated out-the-window imagery onto a screen, such as a domed screen, for a trainee. Such simulators are large, expensive, and costly to maintain.

SUMMARY

The embodiments relate to a head-mounted display (HMD) device that automatically identifies a simulator cockpit located in front of the HMD device, and automatically determines where to place computer-generated imagery with respect to the simulator cockpit. In some embodiments, the HMD device detects movements of a user, such as user movements to activate a cockpit control, and, in response, generates computer-generated imagery based on the cockpit control activation, and overlays the computer-generated imagery on top of a real-world scene presented to the user. Among other advantages, the embodiments reduce the costs of simulators by simulating electronic components of a cockpit such that the simulator cockpit may be devoid of electronics, and in some embodiments, may eliminate the need for projectors that present OTW imagery to the user.

In one embodiment, a head-mounted display (HMD) device is provided. The HMD device includes a frame and a display system coupled to the frame. The display device is configured to present a real-world scene. A stereo depth camera system is coupled to the frame and has a camera field-of-view (FOV). The stereo depth camera system is configured to generate stereo depth camera information comprising frames of imagery and depth data that identifies a distance to a simulator cockpit of a simulator. A processor device is coupled to the stereo depth camera system and to the display system. The processor device is configured to identify, based on the stereo depth camera information, from a plurality of cockpit models, a particular cockpit model that corresponds to the simulator cockpit and that identifies a layout of cockpit controls of the simulator cockpit. The processor device is further configured to, based at least in part on the particular cockpit model and a physical location of the simulator cockpit, generate computer-generated imagery. The processor device is further configured to send the computer-generated imagery to the display system to overlay the computer-generated imagery on top of a portion of the real-world scene.

In another embodiment, a simulation system is provided. The simulation system includes a simulator cockpit that comprises a plurality of cockpit controls. The cockpit controls are mock cockpit controls that are devoid of electronics. The simulation system also includes an HMD device that includes a frame, and a display system coupled to the frame. The display device is configured to present a real-world scene. A stereo depth camera system is coupled to the frame and has a camera FOV. The stereo depth camera system is configured to generate stereo depth camera information comprising frames of imagery and depth data that identifies a distance to a simulator cockpit of a simulator. A processor device is coupled to the stereo depth camera system and to the display system. The processor device is configured to identify, based on the stereo depth camera information, from a plurality of cockpit models, a particular cockpit model that corresponds to the simulator cockpit and that identifies a layout of cockpit controls of the simulator cockpit. The processor device is further configured to, based at least in part on the particular cockpit model and a physical location of the simulator cockpit, generate computer-generated imagery. The processor device is further configured to send the computer-generated imagery to the display system to overlay the computer-generated imagery on top of a portion of the real-world scene.

In another embodiment, a method is provided. The method includes generating, by a stereo depth camera system coupled to a frame and having a camera FOV, stereo depth camera information comprising frames of imagery and depth data that identifies a distance to a simulator cockpit of a simulator. The method further includes identifying, by a processor device, based on the stereo depth camera information, from a plurality of different cockpit models a particular cockpit model that corresponds to the simulator cockpit and that identifies a layout of cockpit controls of the simulator cockpit. The method further includes generating, by the processor device, computer-generated imagery based at least in part on the particular cockpit model and a physical location of the simulator cockpit. The method further includes sending the computer-generated imagery to a display system to overlay the computer-generated imagery on top of a portion of a real-world scene presented by the display system.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified.

The embodiments relate to a head-mounted display (HMD) device that automatically identifies a simulator cockpit located in front of the HMD device, and automatically determines where to place computer-generated imagery with respect to the simulator cockpit. The computer-generated imagery is overlaid on top of a real-world scene presented to a user by a display device. The computer-generated imagery may be cockpit imagery of a simulator cockpit, out-the-window (OTW) imagery, or a combination of cockpit imagery and OTW imagery. For example, computer-generated cockpit imagery may be generated and sent to the display system to overlay a portion of the simulator cockpit. Computer-generated OTW imagery may be generated and sent to the display system to overlay an OTW area of the simulator.

In some embodiments, the HMD device detects movements of the user, such as user movements to activate a cockpit control, and in response, generates computer-generated imagery based on the cockpit control activation, and overlays the computer-generated imagery on top of a real-world scene presented to the user. Among other advantages, the embodiments reduce the costs of simulators by simulating electronic components of a cockpit such that the simulator cockpit may be devoid of electronics, and in some embodiments, may eliminate the need for projectors that present OTW imagery to the user.

Figure 1:
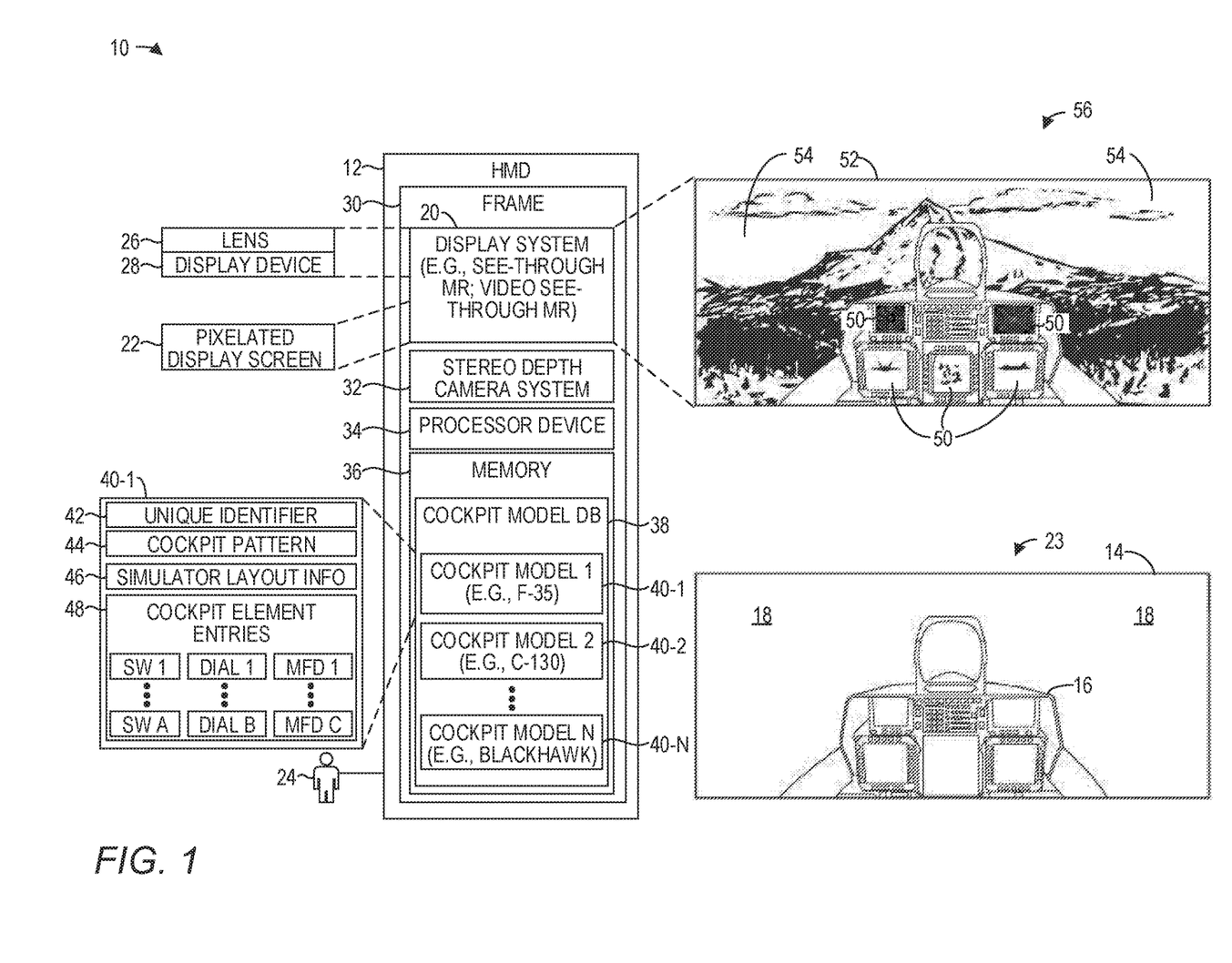
FIG. 1 is a block diagram of an environment in which embodiments may be practiced.

FIG. 1 is a block diagram of an environment 10 in which embodiments may be practiced. The environment 10 includes a head-mounted display (HMD) device 12 and a simulator 14. The simulator 14 includes a simulator cockpit 16, and an OTW area 18. The term "cockpit" as used herein refers to any instrument panel in any vehicle, whether an air vehicle, ground vehicle, or water vehicle. For example, the term "cockpit" as used herein encompasses the instrument panels and controls found in an airplane, a truck, a submarine, a ship, and the like. The HMD device 12 includes a display system 20. In a video see-through embodiment, the display system 20 includes a pixilated display screen 22 on which a mixture of real-world imagery of a real-world scene 23 and computer-generated imagery can be presented to a user 24. The phrase "real-world imagery" as used herein refers to substantially real-time imagery captured by a video camera (discussed below). The phrase "real-world scene" refers to the real world that is present about the user 24 from the perspective of the HMD device 12, and includes, for example, the simulator cockpit 16 and the OTW area 18.

In a see-through embodiment, the display system 20 includes a lens 26 and a display device 28. The lens 26 is transparent, thus presents at least a portion of the real-world scene 23 to the user 24, and has a reflective interior surface such that the display device 28 can project computer-generated imagery onto particular portions of the reflective interior surface to overlay the computer-generated imagery on top of portions of the real-world scene. In some embodiments, the display device 28 can be a liquid crystal display (LCD), liquid crystal on silicon (LCOS), or other suitable display device. The lens 26, in some embodiments, may be manufactured in accordance with the principles disclosed in U.S. Pat. No. 8,781,794, which is hereby incorporated by reference herein.

The HMD device 12 includes a frame 30 to which the display system 20 may be coupled or otherwise attached. The frame 30 includes a structure that is mountable to the head of the user 24. The structure may comprise, for example, a head strap or a pair of arms that extend on each side of the user 24's head and engage ears of the user 24. A stereo depth camera system 32 is coupled to the frame 30 and has a camera field-of-view (FOV) that defines a volume within the real-world scene 23 that can be perceived by the stereo depth camera system 32 at any instance in time. The stereo depth camera system 32 is configured to generate stereo depth camera information comprising frames of imagery of the real-world scene 23 within the camera FOV, and depth data that identifies a distance to things in the real-world scene 23, such as the simulator cockpit 16, for example. The stereo depth camera system 32 may comprise, for example, a ZED mini, available from Stereolabs Inc., 95 Federal Street, San Francisco, Calif. 94107, or any other suitable camera capable of generating imagery of a scene and depth data that that identifies a distance to things in the scene.

The HMD device includes, or is communicatively coupled to, a processor device 34. The processor device 34 is configured to implement much of the processing discussed herein. The processor device 34 is communicatively coupled to the display system 20 and the stereo depth camera system 32. The processor device 34 may be directly coupled to the frame 30, or in other embodiments, may be physically remote from the frame 30, such as in a same room as the simulator 14, and communicatively coupled to the display system 20 and the stereo depth camera system 32 wirelessly or via data communication cables.

The processor device 34 is communicatively coupled to a memory 36 that includes a cockpit model database 38. The cockpit model database 38 stores a plurality of cockpit models 40-1, 40-2-40-N (generally, cockpit models 40), each of which corresponds to a particular simulator cockpit 16. For example, the cockpit model 40-1 may correspond to a F-35 Joint Strike Fighter simulator cockpit 16, the cockpit model 40-2 to a C-130 simulator cockpit 16, and the cockpit model 40-N to a Blackhawk helicopter simulator cockpit 16. The memory 36 may also be physically coupled to the frame 30 or located elsewhere.

In some embodiments the cockpit model 40-1 may include a unique identifier (ID) 42. As discussed in greater detail below, the simulator cockpit 16 may bear indicia, and the processor device 34 may detect the indicia, and match the indicia to a corresponding unique ID 42 of a particular cockpit model 40. The cockpit model 40-1 may also include a cockpit pattern 44. As discussed in greater detail below, the processor device 34 may analyze a pattern of the elements of the simulator cockpit 16 detected in the stereo depth camera information generated by the stereo depth camera system 32 against the predetermined cockpit pattern 44 to determine that the cockpit model 40-1, for example, corresponds to the simulator cockpit 16.

The cockpit model 40-1 may also include simulator layout information 46 that identifies a structural layout of the simulator 14. The simulator layout information 46 may contain, for example, dimensional and location information regarding aspects of the simulator 14, such as the precise dimensions of the simulator cockpit 16 and the OTW area 18. Such information may be used by the processor device 34, for example, to appropriately position computer-generated OTW imagery and/or computer-generated cockpit imagery such that the computer-generated imagery is presented to the user 24 to properly overlay the computer-generated imagery on top of portions of the real-world scene 23.

The cockpit model 40-1 also includes a plurality of cockpit element entries 48. Cockpit element entries 48 correspond to particular features of the simulator cockpit 16, and may correspond to, for example, switches or dials located on the simulator cockpit 16, structural features of the simulator cockpit 16, and the like. The cockpit element entries 48 may contain state information for cockpit controls that correspond to the simulator cockpit 16, such as the position of a switch or dial, and may contain renderable data used to render imagery of the corresponding cockpit element. The cockpit element entries 48 may also include location information and dimensional information that identifies where on the simulator cockpit 16 the corresponding cockpit element is located, the size of the corresponding cockpit element, and any other information suitable and/or necessary for the processor device 34 to generate computer-generated imagery and cause the computer-generated imagery to overlay the computer-generated imagery on top of the real-world scene that depicts the corresponding cockpit element of the simulator cockpit 16. While not shown for purposes of simplicity, the other cockpit models 40-2-40-N contain similar information that corresponds to the particular actual cockpit to which the cockpit models 40-2-40-N correspond.

The simulator cockpit 16 may, for example, comprise a three-dimensional (3D) printed cockpit that accurately structurally simulates a particular cockpit of a corresponding vehicle, such as an aircraft. The 3D printed cockpit may include movable parts, such as a movable switch or dial, and areas for multi-function devices, such as touch-screen displays that, in the corresponding real cockpit, can both present information and receive input from a pilot. The simulator cockpit 16 may be completely devoid of any electronics.

Figure 2:
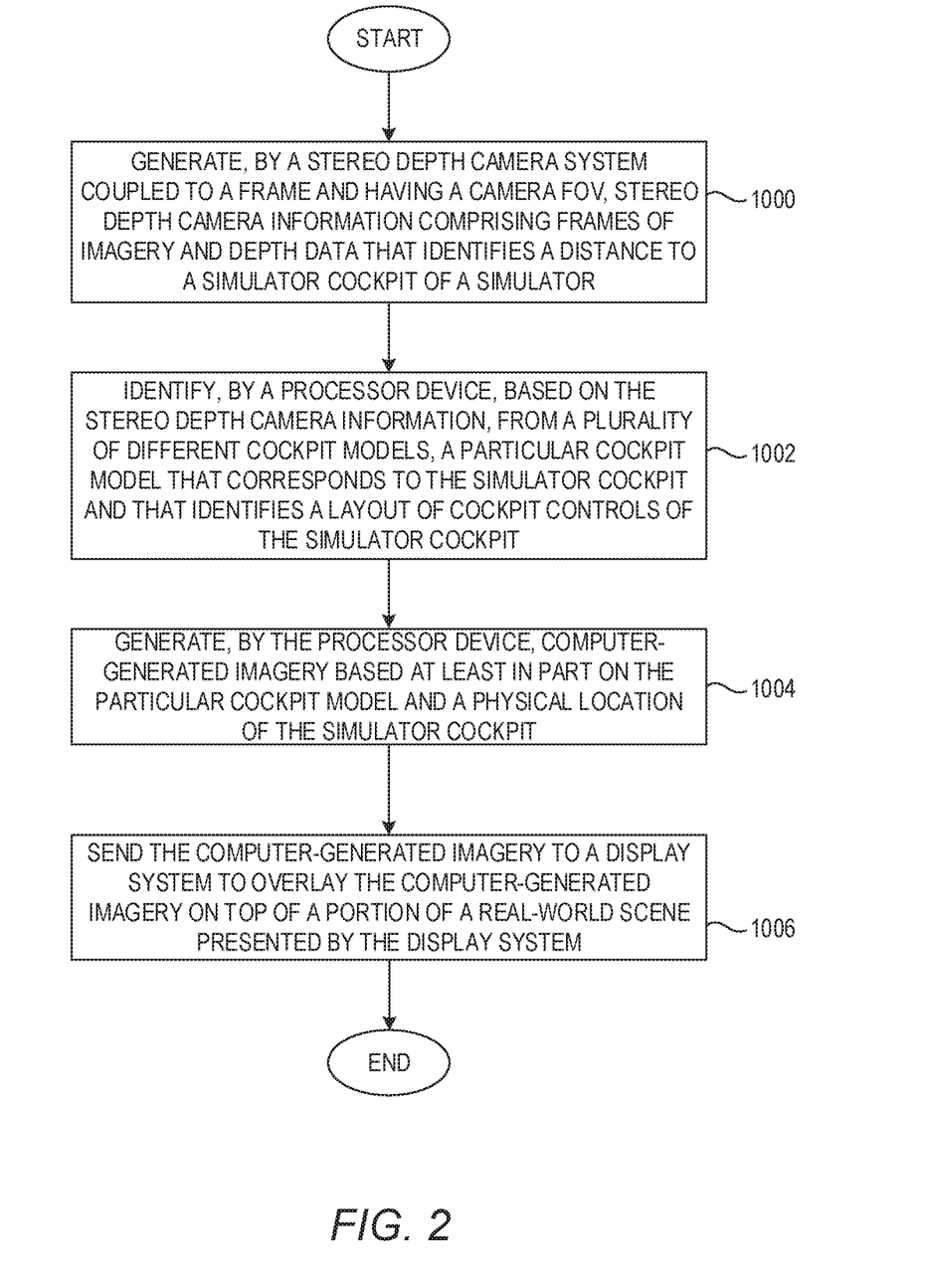
FIG. 2 is a flowchart of a method for automatic cockpit identification and augmented image placement according to one embodiment.

FIG. 2 is a flowchart of a method for automatic cockpit identification and augmented image placement according to one embodiment. FIG. 2 will be discussed in conjunction with FIG. 1. Assume that the user 24 sits in a seat (not illustrated) of the simulator cockpit 16 and faces the simulator cockpit 16. The stereo depth camera system 32, coupled to the frame 30, and which has a camera FOV, generates stereo depth camera information comprising frames of imagery of that portion of the real-world scene 23 within the camera FOV, and generates depth data that identifies a distance to the simulator cockpit 16 of the simulator 14 (FIG. 2, block 1000). The processor device 34 analyzes the stereo depth camera information and identifies, from the plurality of different cockpit models 40-1-40-N, the particular cockpit model 40-1 that corresponds to the simulator cockpit 16 (FIG. 2, block 1002). The cockpit model 40-1 identifies a layout of cockpit controls of the simulator cockpit 16. In one example, the processor device 34 may utilize pattern matching techniques to match patterns identified in the frames of imagery of the simulator cockpit 16 against the cockpit patterns 44 of the cockpit models 40. The processor device 34 generates computer-generated cockpit imagery 50 based at least in part on the cockpit model 40-1 and a physical location of the simulator cockpit 16 (FIG. 2, block 1004). The processor device 34 sends the computer-generated cockpit imagery 50 to the display system 20 to overlay the computer-generated cockpit imagery 50 on top of a portion of the real-world scene 23 presented by the display system 20 (FIG. 2, block 1006).

The embodiments work in conjunction with different types of simulators, and, as discussed previously, different types of display systems 20, such as see-through display systems 20 as well as video see-through display systems 20. In one embodiment, the simulator 14 may include a projection screen 52 that is positioned in front of the simulator cockpit 16. Projectors (not illustrated), may present on the projection screen 52 OTW imagery 54, as illustrated for example in a composite image 56 presented to the user 24 via the display system 20. The OTW imagery 54 simulates what a pilot would see outside of the simulator cockpit 16. In this embodiment, the OTW imagery 54 is part of the real-world scene 23 perceived by the display system 20 since the display system 20 does not generate the OTW imagery 54 in this embodiment. Thus, the display system 20 presents the real-world scene 23 which includes the OTW imagery 54 to the user 24, but overlays portions of the real-world scene 23 with the computer-generated cockpit imagery 50 at locations of the simulator cockpit 16 that correspond to cockpit controls, such that the user 24 perceives what appears to be an actual operating cockpit.

In other examples, the simulator 14 may not include the projection screen 52, and the processor device 34, based on the simulator layout information 46 and the determined location of the simulator cockpit 16 based on the stereo depth camera information, may generate computer-generated OTW imagery. The processor device 34 overlays the real-world scene 23 with the computer-generated OTW imagery as well as with the computer-generated cockpit imagery 50.

In other examples, the simulator 14 includes the screen 52, and one or more lights, such as infrared (IR) lights, either front or rear projected, illuminate the projection screen 52. The processor device 34 detects the IR wavelengths via the imagery provided by the stereo depth camera system 32, or, in some embodiments, via additional IR sensors/camera(s) coupled to the frame 30, generates the computer-generated OTW imagery 54, and overlays the computer-generated OTW imagery 54 on top of the IR imagery for presentation to the user 24.

In a video see-through embodiment, the processor device 34 receives real-world imagery of the real-world scene 23 via the stereo depth camera system 32. In some examples, the processor device 34 may process the real-world imagery prior to presenting any of the real-world imagery on the display screen 22 to ensure that the real-world imagery is a more accurate depiction of what would be seen by the user 24 if the display screen 22 were transparent. For example, the processor device 34 may warp the real-world imagery to adjust (or compensate) for various optical components, such as optical components of the stereo depth camera system 32, and/or the real-world imagery may be transformed to account for a difference in FOV between the eyes of the user 24 and that of the stereo depth camera system 32.

In some embodiments, the processor device 34 processes the real-world imagery by re-projecting the real-world imagery into three-dimensional space 1) to account for a difference in the location of the stereo depth camera system 32 and the eyes of the user 24, 2) to account for differences in FOV of the stereo depth camera system 32 and the eyes of the user 24, 3) to correct for warp and color shift from the optics of the stereo depth camera system 32 and the optics of the display screen 22, 4) to account for head movement of the user 24 during the brief interval of time since the real-world imagery was captured, and 5) to account for predicted head movement of the user 24 during the time it takes for the display screen 22 to display the image.

The processor device 34 generates computer-generated imagery, such as computer-generated OTW imagery and/or computer-generated cockpit imagery, and overlays portions of the processed real-world imagery to generate augmented imagery that includes the real-world imagery and the computer-generated imagery. The processor device 34 sends the augmented imagery to the display screen 22. The locations of the computer-generated imagery within the real-world imagery is based on the cockpit model 40-1 and the actual location, including distance, of the simulator cockpit 16 from the head of the user 24, as determined, for example, via the stereo depth camera information. Note that the stereo depth camera system 32 generates the stereo depth camera information at a particular rate, such as 30, 60, or 120 frames per second, continuously during the simulation.

In a see-through embodiment, the user 24 is presented with the real-world scene 23 directly through the lens 26. The processor device 34 still receives real-world imagery of the real-world scene 23 via the stereo depth camera system 32. The processor device 34 generates computer-generated imagery, such as computer-generated OTW imagery and/or computer-generated cockpit imagery, and causes the display device 28 to reflect the computer-generated imagery off of portions of the interior surface of the lens 26 such that the computer-generated imagery overlays portions of the real-world scene to generate augmented imagery. The locations on the interior surface of the lens 26 of the computer-generated imagery are based on the cockpit model 40-1 and the actual location, including distance, of the simulator cockpit 16 from the head of the user 24, as determined, for example, via the stereo depth camera information.

Figure 3:
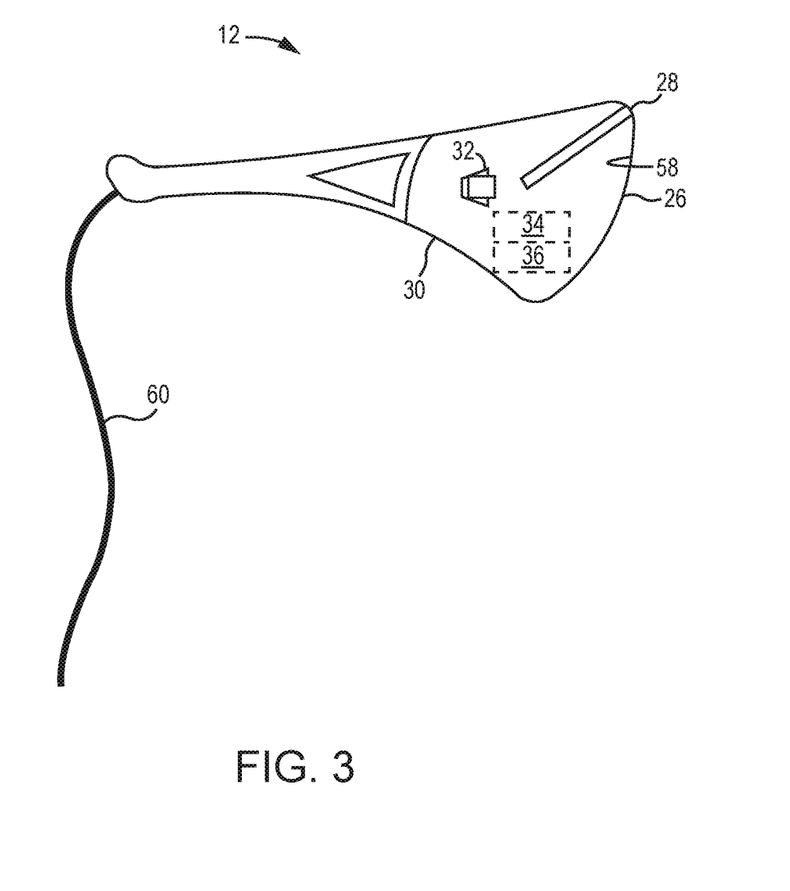
FIG. 3 is a side view of a see-through head-mounted display (HMD) device according to one embodiment.

FIG. 3 is a side view of a see-through HMD device 12 according to one embodiment. The HMD device 12 includes the frame 30. The frame 30 has the stereo depth camera system 32, which in this example includes two cameras, one on each side of the frame 30 (only one illustrated). The display device 28 is coupled to the frame 30, and projects computer-generated imagery onto an interior surface 58 of the lens 26. In one embodiment, embedded within or attached to the frame 30 are the processor device 34 and the memory 36. In other embodiments, the processor device 34 and the memory 36 may be remote from the frame 30, but communicatively coupled to the stereo depth camera system 32 and display device 28 wirelessly, or via a communications cable 60.

Figure 4A:
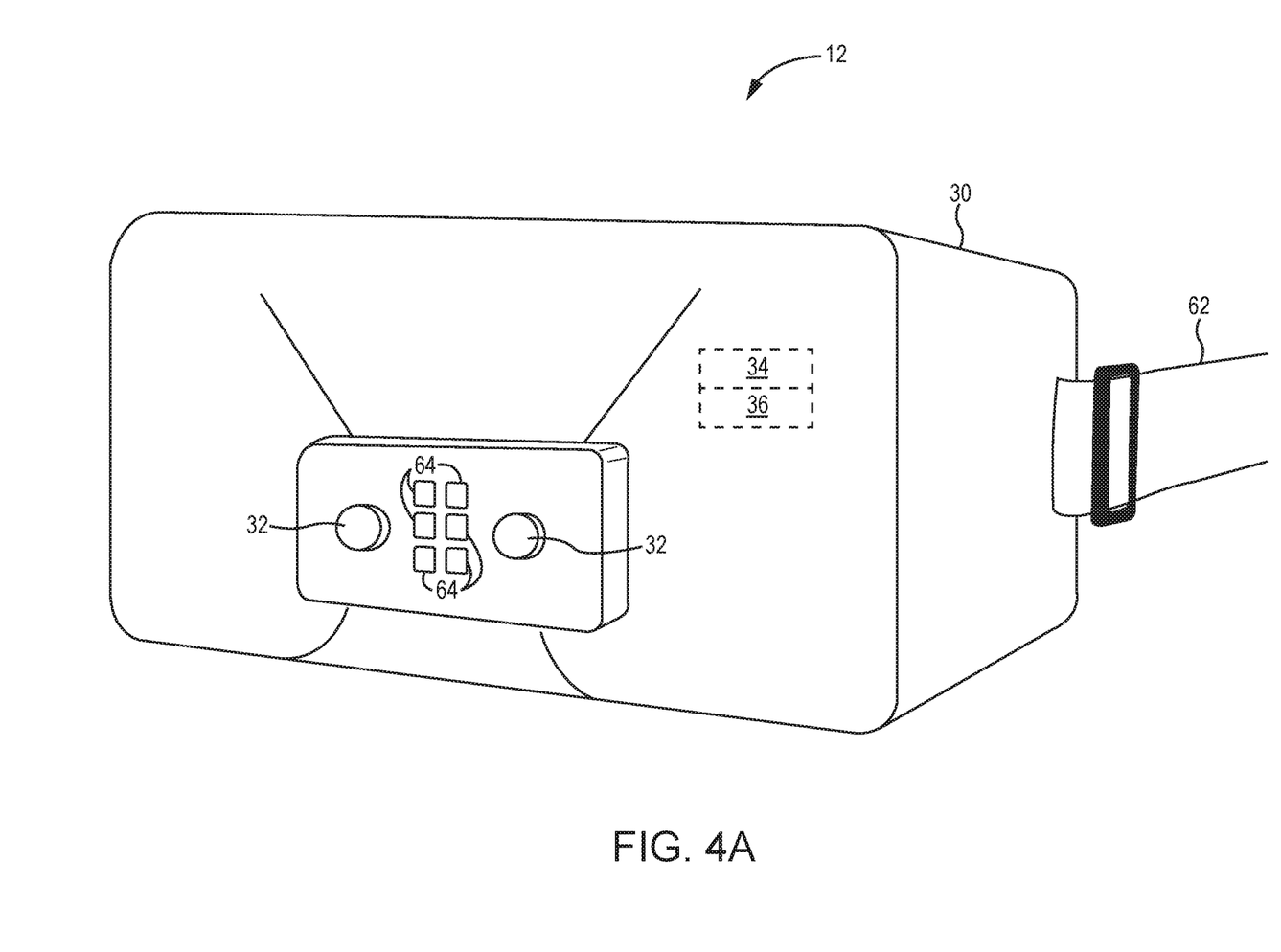
FIGS. 4A-4B are perspective views of a video see-through HMD device according to one embodiment.
Figure 4B:
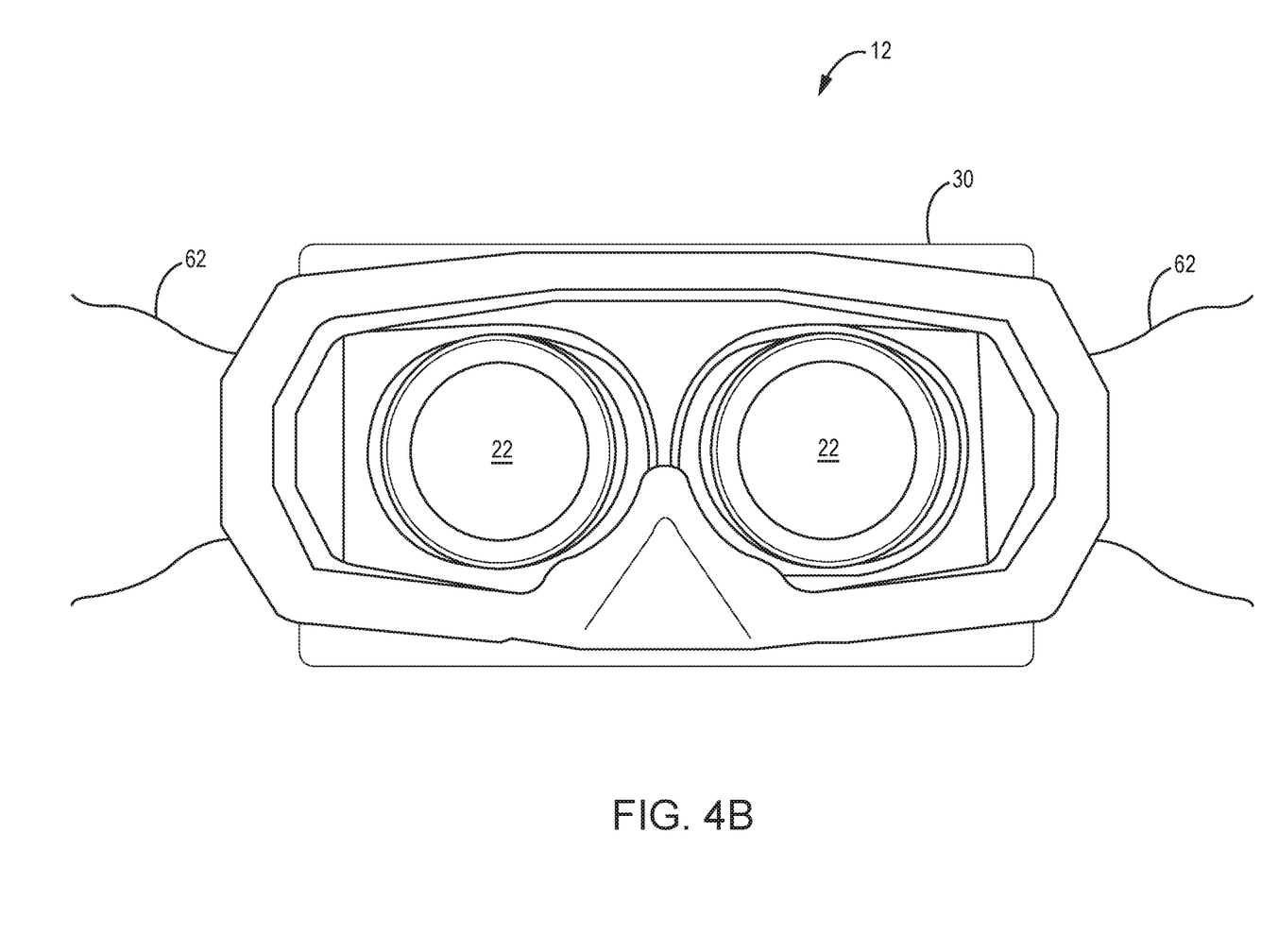

FIGS. 4A-4B are perspective views of a video see-through HMD device 12 according to one embodiment. FIG. 4A illustrates the frame 30, which in this embodiment includes a head strap 62 for fixing the HMD device 12 to the head of the user 24. In this embodiment, the stereo depth camera system 32 includes two separate cameras. A plurality of IR sensors 64 are also coupled to the frame 30. The IR sensors 64 may be used, for example, to gather depth information. In one embodiment, embedded within or attached to the frame 30 are the processor device 34 and the memory 36. In some embodiments, the video see-through HMD device 12 may include additional cameras, such as one or more wide FOV cameras that have a wider FOV than that of the stereo depth camera system 32. In such embodiments, real-world imagery received from each of the various cameras may be merged together to generate real-world imagery within a relatively wide FOV that can be presented to the user 24.

FIG. 4B illustrates the reverse side of the video see-through HMD device 12 that fits over the face of the user 24. In this embodiment, the user 24 views real-world imagery and computer-generated imagery presented on the display screen 22 contained in an interior of the HMD device 12.

Figure 5:
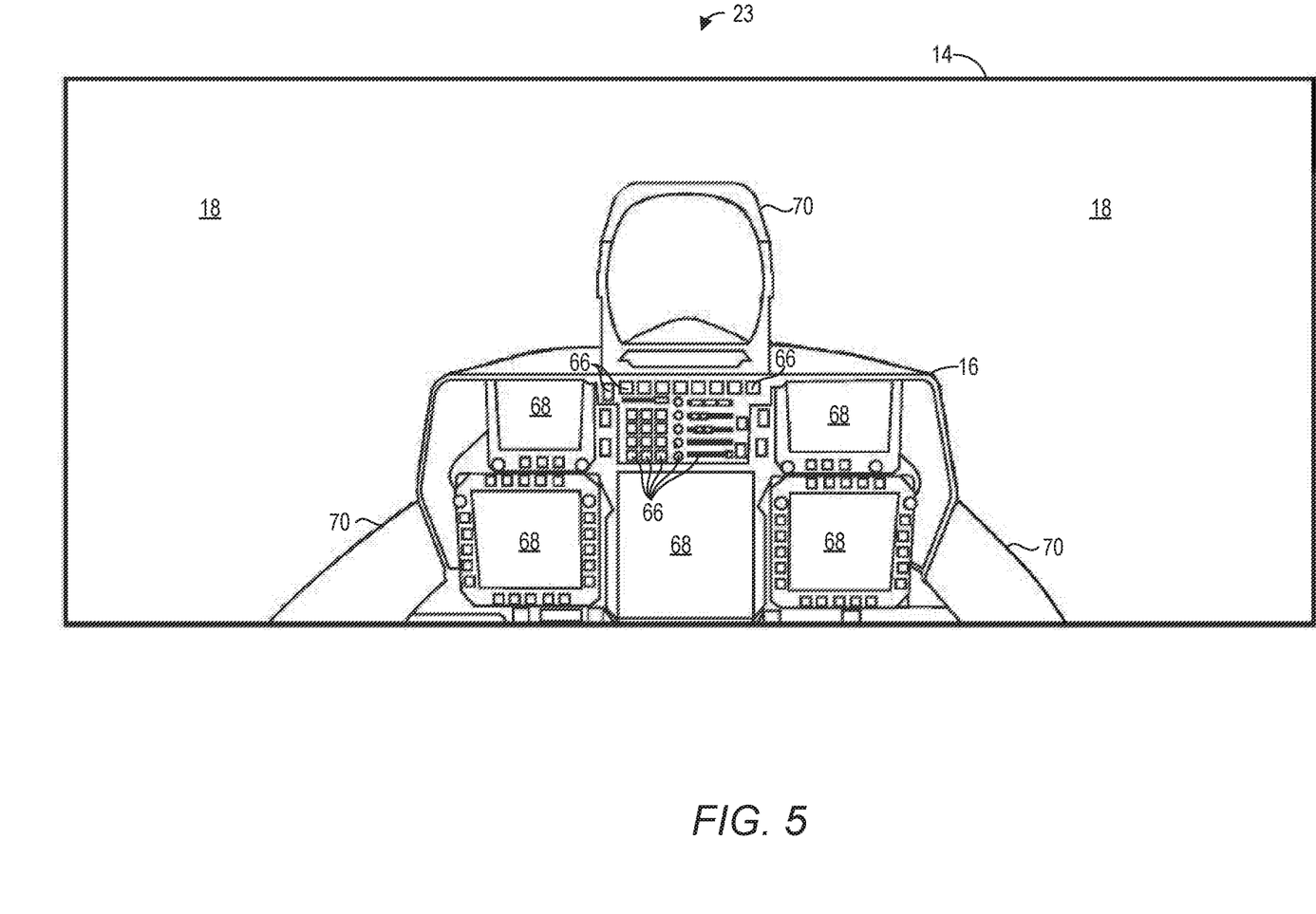
FIG. 5 illustrates the simulator cockpit illustrated in FIG. 1.

FIG. 5 illustrates the simulator cockpit 16 illustrated in FIG. 1. The simulator cockpit 16 includes a plurality of simulated controls, including simulated buttons/switches/dials 66, and simulated multi-function displays (MFDs) 68. The simulator cockpit 16 may be devoid of any electronics. Some or all of the buttons/switches/dials 66 may be movable, such as being rotatable, being able to slide, being able to toggle between two positions, being depressed, or the like, to realistically simulate the movement of cockpit controls in an actual cockpit. The user 24 sits in a cockpit seat (not illustrated) and faces the simulator cockpit 16. The stereo depth camera system 32 generates the stereo depth camera information. The processor device 34, in one embodiment, may utilize the stereo depth camera information to generate a cockpit pattern based on the layout of the simulator cockpit 16. The cockpit pattern may be based on, for example, the shape of a perimeter 70, the locations of the MFDs 68, the locations and shapes of the buttons/switches/dials 66, and the like. The processor device 34 may then compare the generated cockpit pattern to the predetermined cockpit patterns 44 stored in the cockpit models 40 to automatically, without human involvement, identify the particular cockpit pattern 44 of the cockpit model 40-1 as matching the simulator cockpit 16. Based on the cockpit model 40-1, and the continuously received stereo depth camera information, the processor device 34 can generate computer-generated imagery and cause the computer-generated imagery to overlay desired portions of the real-world scene 23 that would otherwise be presented to the user 24.

Figure 6:
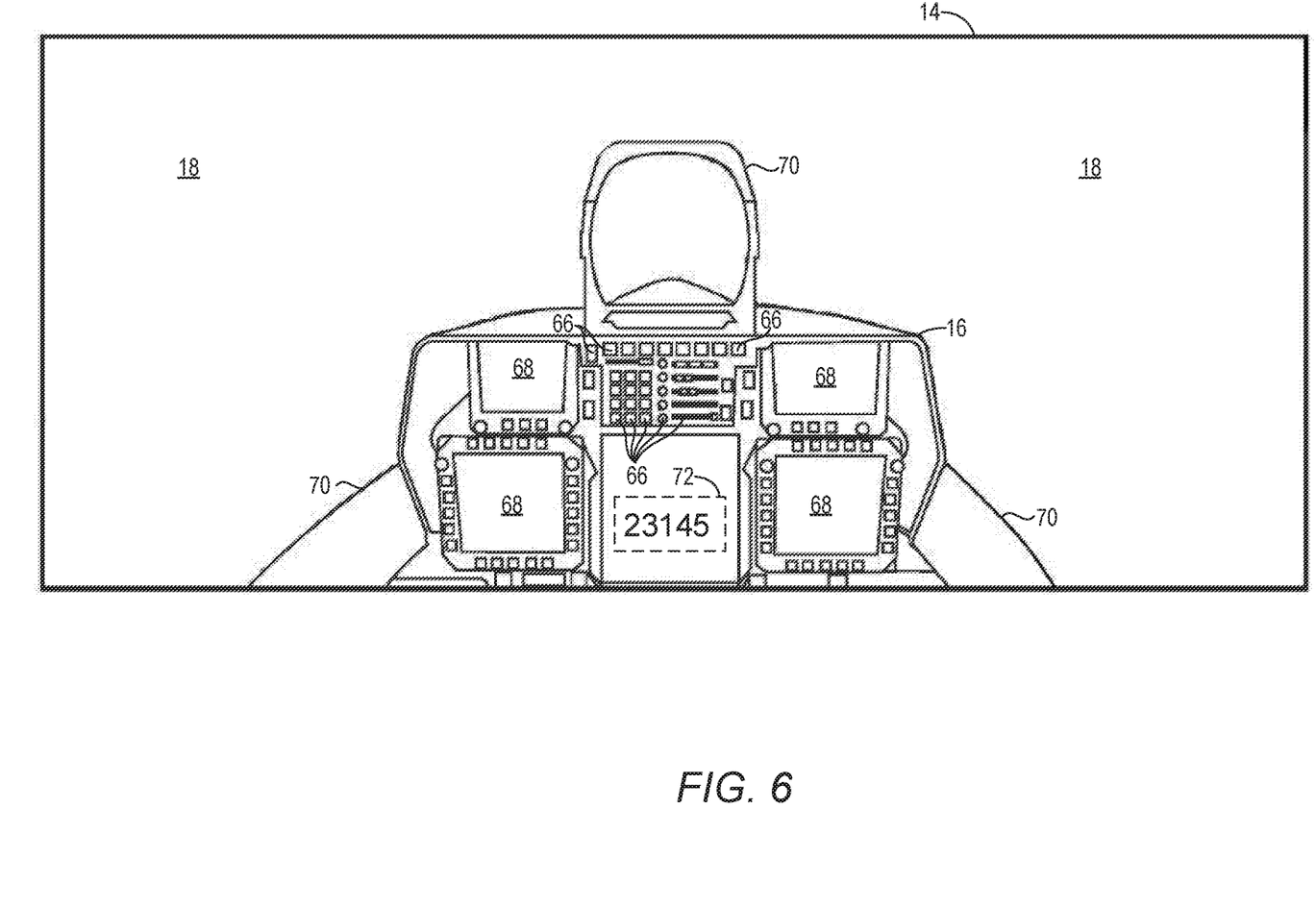
FIG. 6 illustrates the simulator cockpit illustrated in FIG. 1 according to another embodiment.

FIG. 6 illustrates the simulator cockpit 16 illustrated in FIG. 1 according to another embodiment. The simulator cockpit 16 is substantially identical to the cockpit 16 illustrated in FIGS. 1 and 5 except as otherwise noted herein. In this embodiment, the simulator cockpit 16 bears indicia 72. The indicia 72 may be any type of identifier, including, for example, a bar code, an alphanumeric sequence, a quick response (QR) code, or the like. The stereo depth camera system 32 generates the stereo depth camera information which comprises frames of imagery. The processor device 34 identifies the indicia 72 in the imagery, and compares the indicia 72 to the unique IDs 42 stored in the cockpit models 40 to automatically, without human involvement, identify the particular unique ID 42 of the cockpit model 40-1 as matching the indicia 72. Based on the cockpit model 40-1, and the continuously received stereo depth camera information, the processor device 34 can generate computer-generated imagery and cause the computer-generated imagery to overlay desired portions of the real-world scene 23 that would otherwise be presented to the user 24.

Figure 7:
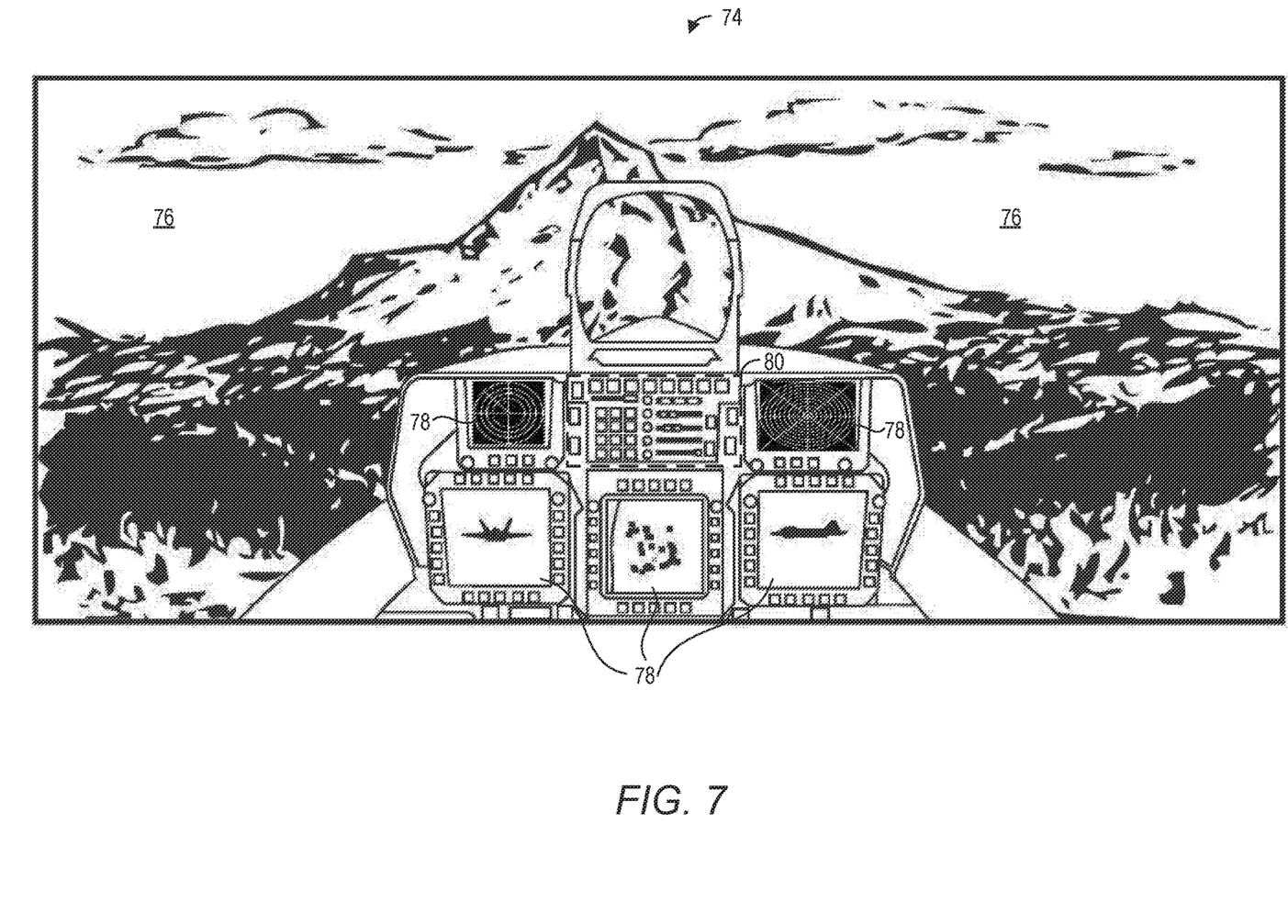
FIG. 7 illustrates a view during a simulation that may be presented by a display system to a user according to one embodiment.

FIG. 7 illustrates a view 74 during a simulation that may be presented by the display system 20 to the user 24 according to one embodiment. The portions of the view 74 that are part of the real-world scene and the portions of the view 74 that are computer-generated imagery may differ depending on the particular system. For example, as discussed above, an OTW portion 76 may be, in one example, computer-generated OTW scenery that is generated by the processor device 34. In other examples, the OTW portion 76 may be imagery that is presented on a screen, such as a domed screen, via external projectors. In such examples, to the HMD device 12, the OTW portion 76 is a part of the real-world scene and is passed to the user 24 without modification and without overlaying computer-generated imagery on top of the OTW portion 76 by the processor device 34.

In some embodiments, cockpit portions 78, for example, may be computer-generated cockpit imagery generated by the processor device 34 and overlaid on top of the corresponding cockpit controls of the simulator cockpit 16. Other portions of the simulator cockpit 16, such as a cockpit portion 80, may be presented by the display system 20 as is, without the overlay of any computer-generated imagery. The particular OTW and cockpit portions that are to be overlaid with computer-generated imagery may be, for example, identified in the corresponding cockpit model 40. Thus, for a first simulator cockpit 16, the processor device 34 may generate computer-generated OTW imagery, but allow the user 24 to view the simulator cockpit 16 as part of the real-world scene. For a second simulator cockpit 16, the processor device 34 may generate computer-generated cockpit imagery, but allow the user 24 to view the OTW area 18 as part of the real-world scene. For a third simulator cockpit 16, the processor device 34 may generate computer-generated OTW imagery and computer-generated cockpit imagery.

Figure 8:
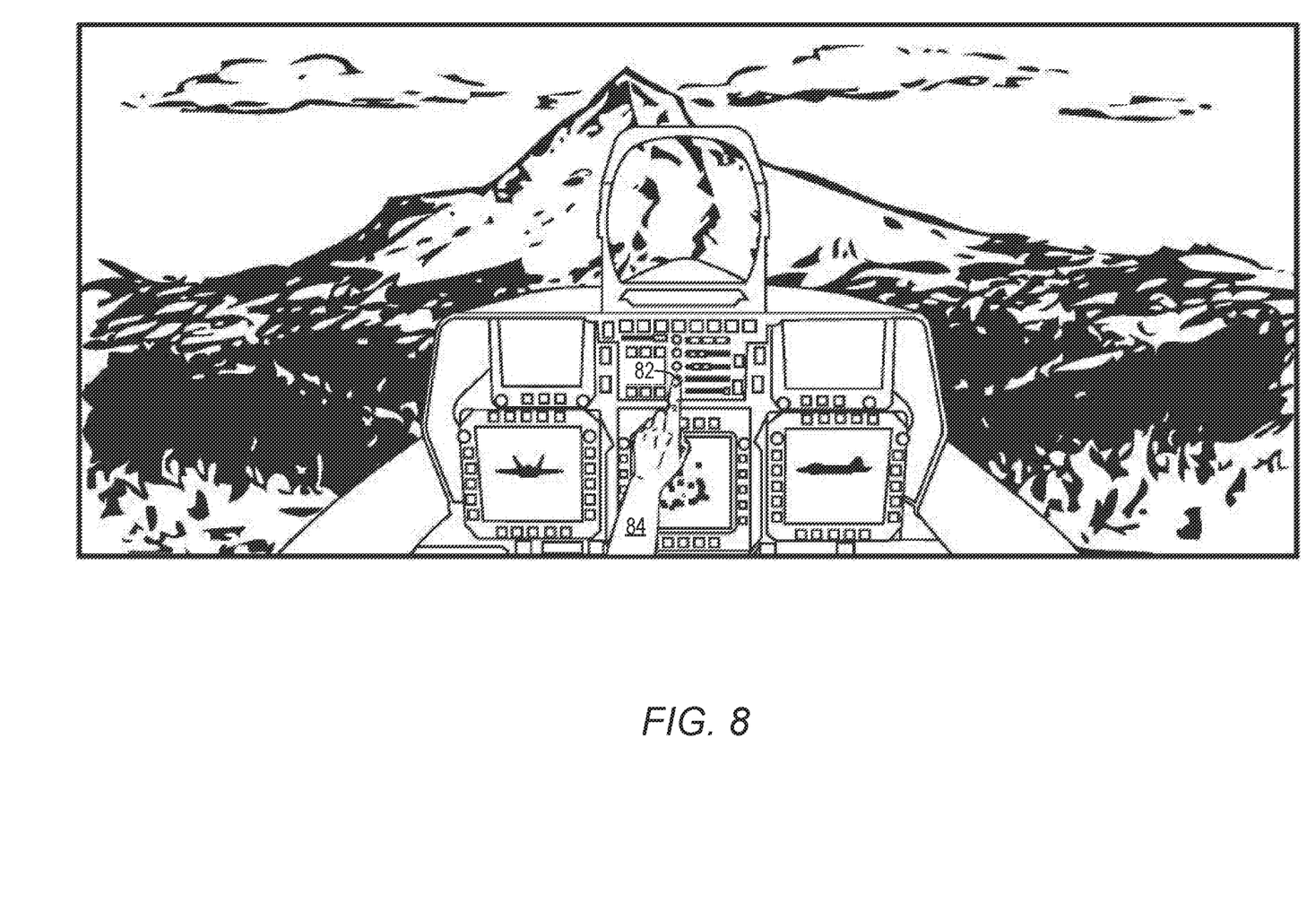
FIG. 8 illustrates a view during a simulation that may be presented by the display system to the user according to another embodiment.

FIG. 8 illustrates a view during a simulation that may be presented by the display system 20 to the user 24 according to another embodiment. In this embodiment, the user 24 touches a cockpit control 82 of the simulator cockpit 16. The processor device 34 detects the movement of an arm 84 and hand of the user 24 into the scene that is within the FOV of the display system 20, and, in one embodiment, may dynamically generate a mask that is coextensive with the arm 84 and hand of the user 24 to inhibit the overlay of computer-generated imagery on top of the arm 84 and hand such that the user 24 can see their own arm and hand via the display system 20.

The processor device 34, based on the imagery generated by the stereo depth camera system 32 and based on the cockpit model 40-1, determines that a particular cockpit control has been contacted by the user 24. In this example, assume that the cockpit control contacted by the user 24 is a cockpit control for which the processor device 34 generates computer-generated cockpit imagery. The processor device 34 then alters the computer-generated cockpit imagery to show the cockpit control as being activated, such as rotated, depressed, or the like.

Figure 9:
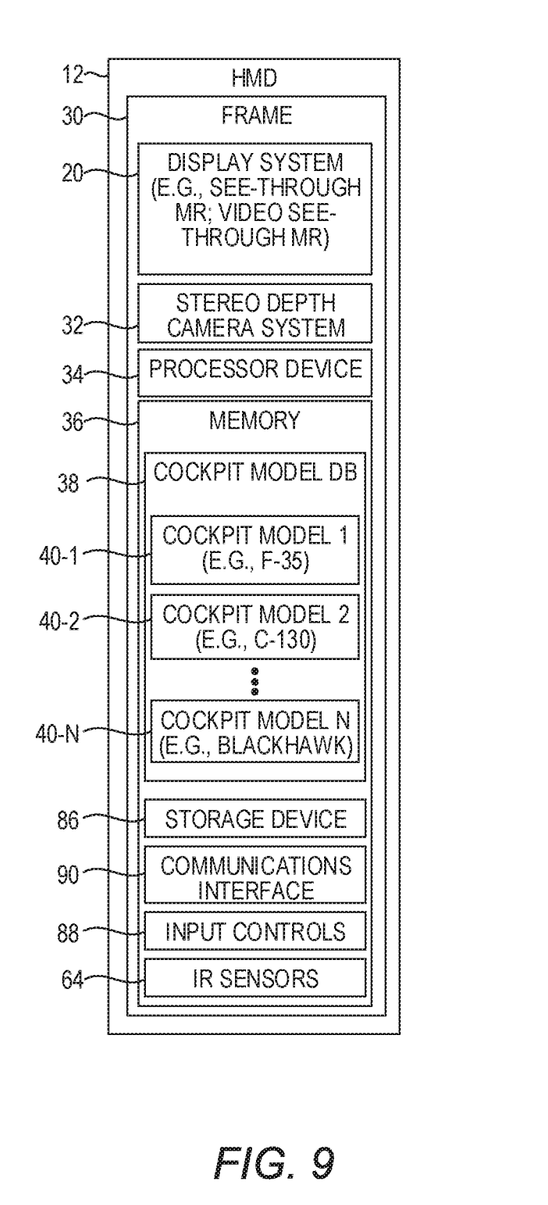
FIG. 9 is a block diagram of an HMD device according to one embodiment.

FIG. 9 is a block diagram of the HMD device 12 illustrated in FIG. 1 showing additional components according to one embodiment. The HMD device 12 may include a storage device 86, which provides non-volatile storage of data, data structures, computer-executable instructions, and the like. The storage device 86 may include, for example the cockpit model database 38, and a computer program product that includes complex programming instructions, such as complex computer-readable program code, to cause the processor device 34 to carry out the steps described herein. Thus, the computer-readable program code can comprise software instructions for implementing the functionality of the embodiments described herein when executed on the processor device 34.

The HMD device 12 may also include one or more input controls 88, such as buttons, via which the user 24 can interface with the HMD 12. The input controls 88 may, for example, allow the user 24 to set certain configuration options of the HMD device 12. In one embodiment, the processor device 34, after determining the particular cockpit model 40 of the plurality of cockpit models 40, as discussed above, may generate information that identifies the cockpit model 40 that was selected and present the information via the display system 20, and allow the user 24 to confirm or reject the selection.

The HMD device 12 may also include one or more communications interfaces 90 to facilitate communications with other devices in a simulation system. For example, in a simulation system where another computing device generates OTW imagery and presents such OTW imagery on a screen, the HMD device 12 may communicate with such other computing device to identify the manipulation of cockpit controls which may alter the OTW imagery that is presented on the screen. For example, if the user 24 rotates a control wheel to alter the direction of the aircraft, the OTW imagery will change to reflect the change in direction.

Those skilled in the art will recognize improvements and modifications to the preferred embodiments of the disclosure. All such improvements and modifications are considered within the scope of the concepts disclosed herein and the claims that follow.

What is claimed is:

1. A head-mounted display (HMD) device comprising:
   a frame;
   a display system coupled to the frame and configured to present a real-world scene;
   a stereo depth camera system coupled to the frame and having a camera field-of-view (FOV), the stereo depth camera system configured to generate stereo depth camera information comprising frames of imagery and depth data that identifies a distance to a simulator cockpit of a simulator; and
   a processor device coupled to the stereo depth camera system and to the display system, configured to:
      identify, based on the stereo depth camera information, from a plurality of cockpit models, a particular cockpit model that corresponds to the simulator cockpit and that identifies a layout of cockpit controls of the simulator cockpit;
      based at least in part on the particular cockpit model and a physical location of the simulator cockpit, generate computer-generated imagery; and
      send the computer-generated imagery to the display system to overlay the computer-generated imagery on top of a portion of the real-world scene.

2. The HMD device of claim 1 wherein the display system comprises a pixelated display screen comprising a plurality of pixels configured to be positioned in front of a user's eyes.

3. The HMD device of claim 1 wherein the display system comprises:
a transparent lens having a reflective interior surface configured to be positioned in front of a user's eyes; and
a display device coupled to the frame, the display device configured to reflect images off the reflective interior surface into the eyes of the user.

4. The HMD device of claim 1 wherein to identify the particular cockpit model of the plurality of different cockpit models, the processor device is further configured to:
match patterns of elements of the simulator cockpit detected in the stereo depth camera information against predetermined cockpit patterns to determine the particular cockpit model.

5. The HMD device of claim 1 wherein each cockpit model of the plurality of cockpit models has a corresponding unique identifier of a plurality of unique identifiers, and wherein to identify the particular cockpit model of the plurality of different cockpit models, the processor device is further configured to:
detect indicia located on the simulator cockpit; and
match the indicia to a corresponding unique identifier of the particular cockpit model.

6. The HMD device of claim 1 wherein to generate the computer-generated imagery, the processor device is further configured to:
generate computer-generated cockpit imagery that depicts a simulated cockpit control; and
send the computer-generated imagery to the display system to overlay the computer-generated imagery on top of a portion of the simulator cockpit depicted in the real-world scene.

7. The HMD device of claim 1 wherein the display system comprises:
a pixelated display screen comprising a plurality of pixels configured to be positioned in front of a user's eyes; and
wherein to generate the computer-generated imagery, the processor device is further configured to:
receive real-world imagery from the stereo depth camera system depicting the real-world scene, the real-world imagery including real-time imagery depicting a cockpit control in the simulator cockpit;
generate computer-generated simulated cockpit imagery that depicts a simulated cockpit control that corresponds to the cockpit control in the simulator cockpit;
overlay the computer-generated simulated cockpit imagery on top of the real-time imagery depicting the cockpit control in the simulator cockpit to generate augmented real-time imagery; and
cause the display system to present the augmented real-time imagery.

8. The HMD device of claim 1 wherein the display system comprises:
a transparent lens having a reflective interior surface configured to be positioned in front of a user's eyes; and
a display device coupled to the frame, the display device configured to reflect images off the reflective interior surface into the eyes of the user;
wherein to generate the computer-generated imagery, the processor device is further configured to:
generate computer-generated cockpit imagery that depicts a simulated cockpit control; and
cause the display system to present the computer-generated cockpit imagery on the reflective interior surface to overlay the computer-generated cockpit imagery on top of a corresponding cockpit control of the simulator cockpit.

9. The HMD device of claim 1 wherein to generate the computer-generated imagery, the processor device is further configured to:
determine, based on the particular cockpit model, a location of an out-the-window (OTW) area;
generate computer-generated OTW imagery that depicts a simulated environment outside the simulator cockpit; and
cause the display system to present the computer-generated OTW imagery to overlay the computer-generated OTW imagery on top of the location of the OTW area.

10. The HMD device of claim 1 wherein the processor device is further to:
detect a contact of a digit of a user with a location on the simulator cockpit that corresponds with a cockpit control identified in the particular cockpit model;
generate computer-generated cockpit imagery of the cockpit control based on the detected contact; and
cause the display system to present the computer-generated cockpit imagery to overlay the computer-generated cockpit imagery on top of the cockpit control of the simulator cockpit.

11. The HMD device of claim 1 further comprising a plurality of infrared sensors coupled to the frame.

12. A simulation system comprising:
a simulator cockpit comprising a plurality of cockpit controls, the plurality of cockpit controls being mock cockpit controls that are devoid of electronics; and
a head-mounted display (HMD) device comprising:
a frame;
a display system coupled to the frame and configured to present a real-world scene;
a stereo depth camera system coupled to the frame and having a camera field-of-view (FOV), the stereo depth camera system configured to generate stereo depth camera information comprising frames of imagery and depth data that identifies a distance to the simulator cockpit; and
a processor device coupled to the stereo depth camera system and to the display system, configured to:
identify, based on the stereo depth camera information, from a plurality of cockpit models, a particular cockpit model that corresponds to the simulator cockpit and that identifies a layout of cockpit controls of the simulator cockpit;
based at least in part on the particular cockpit model and a physical location of the simulator cockpit, generate computer-generated imagery; and
send the computer-generated imagery to the display system to overlay the computer-generated imagery on top of a portion of the real-world scene.

13. A method comprising:
generating, by a stereo depth camera system coupled to a frame and having a camera field-of-view (FOV), stereo depth camera information comprising frames of imagery and depth data that identifies a distance to a simulator cockpit of a simulator;
identifying, by a processor device, based on the stereo depth camera information, from a plurality of different cockpit models a particular cockpit model that corresponds to the simulator cockpit and that identifies a layout of cockpit controls of the simulator cockpit;

generating, by the processor device, computer-generated imagery based at least in part on the particular cockpit model and a physical location of the simulator cockpit; and sending the computer-generated imagery to a display system to overlay the computer-generated imagery on top of a portion of a real-world scene presented by the display system.

14. The method of claim 13 wherein identifying the particular cockpit model of the plurality of different cockpit models comprises matching patterns of elements of the simulator cockpit detected in the stereo depth camera information against predetermined cockpit patterns to determine the particular cockpit model.

15. The method of claim 13 wherein each cockpit model of the plurality of cockpit models has a corresponding unique identifier of a plurality of unique identifiers, and wherein identifying the particular cockpit model of the plurality of different cockpit models comprises:

detecting indicia located on the simulator cockpit; and matching the indicia to a corresponding unique identifier of the particular cockpit model.

16. The method of claim 13 wherein generating the computer-generated imagery comprises:

generating computer-generated cockpit imagery that depicts a simulated cockpit control; and sending the computer-generated imagery to the display system to overlay the computer-generated imagery on top of a portion of the simulator cockpit depicted in the real-world scene.

17. The method of claim 13 wherein the display system comprises a pixelated display screen comprising a plurality of pixels configured to be positioned in front of a user's eyes; and wherein generating the computer-generated imagery comprises:

receiving real-world imagery from the stereo depth camera system depicting the real-world scene, the real-world imagery including real-time imagery depicting a cockpit control in the simulator cockpit;

generating computer-generated simulated cockpit imagery that depicts a simulated cockpit control that corresponds to the cockpit control in the simulator cockpit;

overlaying the computer-generated simulated cockpit imagery on top of the real-time imagery depicting the cockpit control in the simulator cockpit to generate augmented real-time imagery; and causing the display system to present the augmented real-time imagery.

18. The method of claim 13 wherein the display system comprises a transparent lens having a reflective interior surface configured to be positioned in front of a user's eyes; and a display device coupled to the frame, the display device configured to reflect images off the reflective interior surface into the eyes of the user; and wherein generating the computer-generated imagery comprises:

generating computer-generated cockpit imagery that depicts a simulated cockpit control; and causing the display system to present the computer-generated cockpit imagery on the reflective interior surface to overlay the computer-generated cockpit imagery on top of a corresponding cockpit control of the simulator cockpit.

19. The method of claim 13 wherein generating the computer-generated imagery comprises:

determining, based on the particular cockpit model, a location of an out-the-window (OTW) area;

generating computer-generated OTW imagery that depicts a simulated environment outside the simulator cockpit; and causing the display system to present the computer-generated OTW imagery to overlay the computer-generated OTW imagery on top of the location of the OTW area.

20. The method of claim 13 further comprising:

detecting a contact of a digit of a user with a location on the simulator cockpit that corresponds with a cockpit control identified in the particular cockpit control model;

generating computer-generated cockpit imagery of the cockpit control based on the detected contact; and causing the display system to present the computer-generated cockpit imagery to overlay the computer-generated cockpit imagery on top of the cockpit control of the simulator cockpit.

* * * * *